Figure 1:
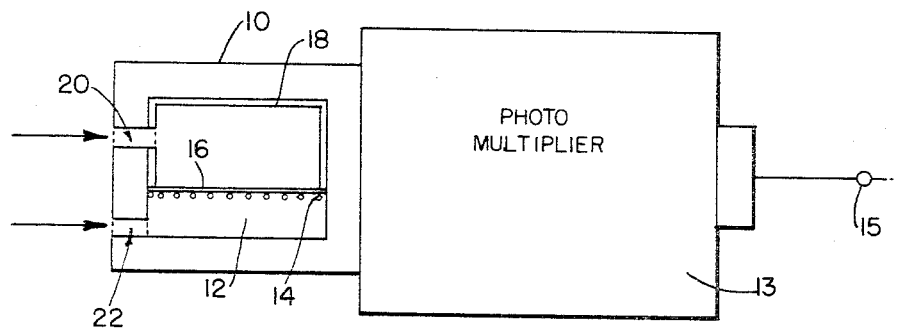

Aug. 29, 1967  R. M. MAIN  3,339,070
AIR MONITORING SYSTEM HAVING A SCINTILLATING PLASTIC
AND A PHOSPHORESCENT FILM WITH MEANS TO DETECT
LIGHT PULSES WITH DIFFERENT DECAY TIMES
Filed Aug. 12, 1963

INVENTOR.
ROBERT M. MAIN
BY
Weingarten, Oxenhud & Pandiscio
ATTORNEYS

United States Patent Office 3,339,070
Patented Aug. 29, 1967

3,339,070
AIR MONITORING SYSTEM HAVING A SCINTILLATING PLASTIC AND A PHOSPHORESCENT FILM WITH MEANS TO DETECT LIGHT PULSES WITH DIFFERENT DECAY TIMES
Robert M. Main, Oakland, Calif., assignor to Laboratory for Electronics, Inc., Boston, Mass., a corporation of Delaware
Filed Aug. 12, 1963, Ser. No. 301,285
5 Claims. (Cl. 250—71.5)

This invention relates in general to monitoring systems and in particular to a new and improved monitoring system for the detection of alpha activity arising from contaminants in the air.

With the advent of nuclear explosions and the accompanying radioactive fallout in the atmosphere, it has become imperative that monitoring systems be developed which cannot only detect but also accurately estimate the quantity of radioactive contaminants in the air. In most of such systems, the atmospheric contaminants are collected on a filter paper in a constant flow monitoring system. In order, however, to accurately estimate the level of radioactivity of the atmospheric contaminants, it is necessary that the radioactivity arising from naturally radioactive materials be subtracted. It has been found that nearly all of the natural alpha activity arises from the daughter products of radon, thoron, and actinon (the radioactive gaseous disintegration products of radium, thorium, and actinium). Of these three gases, only radon, due to its relatively long half-life, is able to escape in quantity into the atmosphere. Since it is generally assumed that radon and its daughters are in equilibrium in the air and the daughters immediately upon appearance attach themselves to particulate matter in the air, the filter collects with equal efficiency all of these daughters. The following table illustrates the principle decay scheme of radium down to the stable lead isotope RaG.

| Element | Atomic Weight | Atomic Number | Type of Disintegration | Half-life |
|---|---|---|---|---|
| Ra | 226 | 88 | | 1,590 y. |
| Rn | 222 | 86 | | 3.825 d. |
| RaA (Po) | 218 | 84 | | 3.05 m. |
| RaB (Pb) | 214 | 82 | | 26.8 m. |
| RaC (Bi) | 214 | 83 | | 19.7 m. |
| RaC' (Po) | 214 | 84 | | $150_{10}^{-6}$ s |
| RaD (Pb) | 210 | 82 | | 22 y. |
| RaE (Bi) | 210 | 83 | | 5 d. |
| RaF (Po) | 210 | 84 | | 140 d. |
| RaG (Pb) | 206 | 82 | Stable lead isotope | |

An analysis of the activity on a filter indicates that, in equilibrium, approximately 95% of the natural alpha activity is due to the decay of RaC'. This isotope has an extremely short half-life (approximately 150 microseconds) and descends from RaC by beta decay. It is one of the basic purposes of the invention herein to provide apparatus which will eliminate from consideration all alpha particles arising from the decay of RaC' by allowing all beta particles to gate off an alpha particle counter for several half-lives of RaC'.

Because of the extremely short half-life of RaC', the alpha-beta detector itself must be able to detect both alpha and beta particles simultaneously. This was generally accomplished in the prior art by the use of two individual detectors, one for each type of particle. Due to the bulk of the alpha detector, which absorbed an appreciable fraction of the beta particles, and the difficulty of arranging 4π geometry for the beta detector, which must completely surround the alpha detector, the resulting combinations suffered a considerable loss in beta detection efficiency. In addition, the detector was bulky and complicated, difficult to shield from extraneous ambient radiation, and excessively costly in that the two separate detectors required two photomultiplier tubes, their associated circuitry and the large shielding necessary for the two counter system.

It is, therefore, the primary object of the present invention to provide a new and improved air monitoring system.

It is another object of the present invention to provide an improved air monitoring system which allows the efficient elimination of natural alpha activity by detecting beta and alpha particles in pseudo coincidence.

It is a further object of the present invention to provide a radiation detector which can detect both alpha and beta particles simultaneously and still maintain an extremely high beta detection efficiency.

It is another object of the present invention to provide a detection device for simultaneously detecting alpha and beta particles using only one photomultiplier tube.

It is still another object of the present invention to provide an improved radiation detector which is small, simple in design, and easy to shield from extraneous ambient radiation.

In general, the invention includes a block of scintillating plastic surrounding both a phosphorescent film and a filter which is adapted to collect particulate matter in the atmosphere. The phosphorescent film (and the filter) absorb substantially all alpha particles emitted from the particulate matter in the filter while transmitting substantially all of the emitted beta particles, which are then absorbed in the scintillating plastic (which has essentially a 4π geometry). A single photomultiplier tube provides electrical pulses characterized either by the fast decay time of the light pulses produced in the scintillating plastic by the beta particles or the slow decay time of the light pulses produced in the phosphorescent film by the alpha particles. A discriminator circuit responsive to the photomultiplier output identifies the output pulses as alpha pulses or beta pulses depending on the decay time of such pulses. Those output pulses which are identified as alpha pulses are counted by an alpha pulse counter for a chosen time interval after their identification and thereby to reduce the background count of the natural alpha activity, RaC'.

Figure 2:
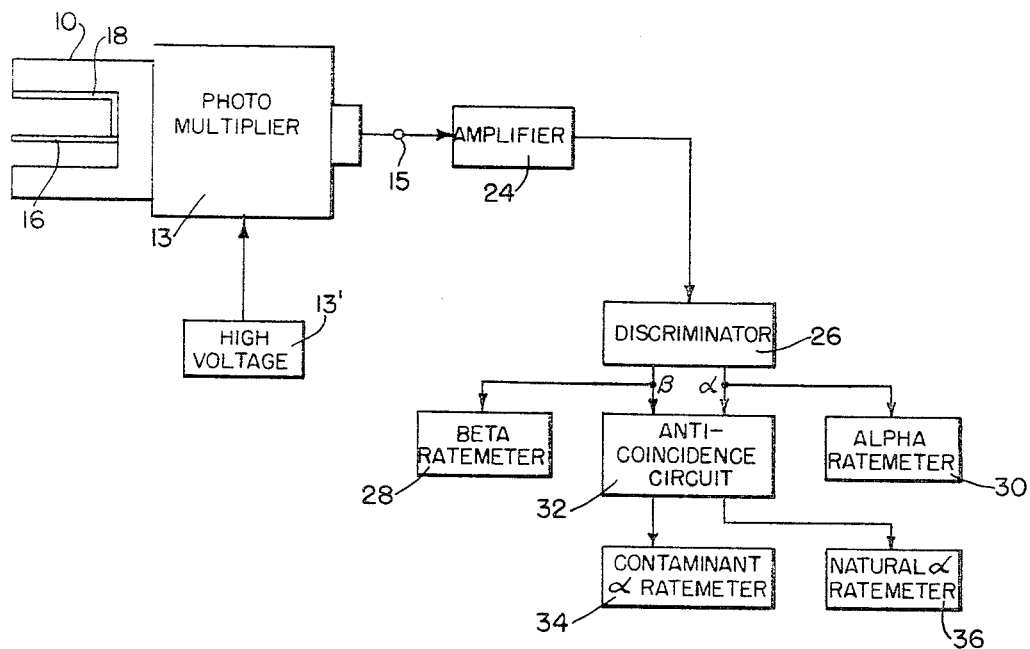

These and other objects of the present invention together with further features and advantages thereof will become more apparent from the following detailed description in which:

FIG. 1 is a partial cut-away diagram of a preferred embodiment of the present invention; and FIG. 2 diagrammatically depicts a complete system embodying the apparatus shown in FIG. 1.

In FIG. 1, a cross-sectional view is presented of a block of scintillating plastic 10 placed in close association with a photomultiplier tube 13. The plastic block 10 may, for example, consist of a short cylinder split in half and then hollowed out to create a void 12 in which rests a sheet of filter paper 16 on a supporting grid structure 14. The plastic block 10 is machined so that the periphery of the filter paper 16 is firmly clamped to avoid air leakage; with slight modifications, the plastic block 10 itself may be used to support the filter paper 16 at its periphery. The scintillating plastic block 10, whose output light pulses have a short decay time, comprises the beta particle detector with a geometry of essentially 4π. Other fast phosphors, such as stilbene and anthracene, could also be used. Inside the upper segment of the plastic block 10 is cemented a thin layer 18 of a phosphorescent material having a long decay time; such a layer 18 may be, for example ZnS (silver activated), $Zn_2SiO_4$, NaI, CeI, or other slow phosphors. An intake channel 20 is provided to allow the air to be monitored to pass through the filter paper 16

(and the grid 14) and then to be drawn out through an exit channel 22. Except for the intake channel 20 and the exit channel 22, the entire structure is surrounded by a suitable radiation shield, not shown.

In operation, the radioactive material is collected on the upper side of the filter paper 16. Since beta particles have approximately 100–1000 times the range of alpha particles, any beta particle emitted is stopped by the plastic block 10 while passing through the filter paper 16 or the phosphorescent layer 18 with little or no energy loss; a light pulse having a short decay time (approximately $5 \times 10^{-9}$ sec.) is thus produced by a beta particle in the plastic scintillator 10. The phosphorescent layer 18 can easily be made thick enough to stop virtually all alpha particles while stopping no beta particles; a light pulse having a long decay time (greater than $10^{-7}$ sec.) is thus produced by an alpha particle. While ordinarily the filter paper 16 stops all alpha particles passing through it, the phosphorescent layer 18 can be extended below the filter paper 16 as an added precaution. The photomultiplier tube 13 detects the two different types of light pulses given off by the plastic block 10 and the phosphorescent layer 18 and then provides a corresponding voltage on the single output terminal 15. Phosphors may be chosen which will reverse the decay constants for alpha and beta particles and the invention is not to be limited to the selection described above.

FIG. 2 shows a preferred embodiment of the air monitoring system comprising the present invention. An alpha-beta detector comprising a plastic scintillating block 10, a zinc sulphide film 18, and a photomultiplier tube 13 (along with its associated high voltage supply 13') provides a voltage signal on the single output terminal 15. The alpha-beta detector shown in FIG. 2 is a less detailed drawing of the apparatus described in FIG. 1.

The single output terminal 15 of the photomultiplier tube 13 is connected to an amplifier 24 which amplifies the signals generated by the alpha and beta particles. As previously explained, these signals may have either a short or a long decay time. The amplified signals are fed into a decay-time discriminator 26 which, in accordance with the decay time of the incoming signal, gives forth pulses corresponding to alpha or beta particles. The alpha pulses are counted in the alpha-ratemeter 30 and the beta pulses are counted in the beta-ratemeter 28. In addition, the alpha and beta pulses are fed into an anti-coincidence circuit 32. In the anti-coincidence circuit 32, the beta pulses operate a rejection gate (with a time constant of approximately five hundred microseconds or several half-lives of RaC') on the contaminant alpha output channel. If an alpha particle follows a beta particle within 500 microseconds a count is then recorded on the natural RaC' alpha ratemeter 36. In other words, a count is recorded on the natural RaC' alpha ratemeter 36 if and only if an alpha pulse is preceded by a beta pulse within approximately 500 microseconds. If the alpha pulse follows the beta pulse with more than a 500-microsecond difference, a count is recorded on the contaminant alpha ratemeter 34.

In this system, there are thus four pieces of information available from the detector: the total beta count, the total alpha count, the normal alpha count, and the contaminant alpha count. With this information, the knowledge of the efficiency of the two phosphors, and the decay scheme of radon and its daughters, it is possible at all times to determine the unnatural contaminants over a background consisting primarily of alpha particles from RaA (which background is a factor of 10 below the usual RaC' background). Under actual operating conditions, with the rejection gate set at 500 microseconds, it is estimated that such a system may reject 77% of the RaC' alpha particles. Since the beta counting rates experienced under normal monitoring conditions allow this gate to be increased to one millisecond without decreasing the alpha counting efficiency appreciably, the rejection rate of the RaC' alpha particles might approach 90%. The information provided also enables alpha to beta ratios of the contaminant material to be calculated.

In the foregoing system, it is seen that the amplifier 24 is not necessary if the pulses appearing from the photomultiplier tube are of sufficient magnitude. In addition, all of the ratemeters shown are not necessary. For instance, the alpha ratemeter 30 may be dispensed with if a total count is not needed, or, in the alternative, if the counts from the natural RaC' alpha ratemeter 36 and the contaminant alpha ratemeter 34 are summed. Since the decay-time discriminator 26 and the anti-coincident circuit 32 are standard components well known in the art, it is felt that further elaboration of these components is not necessary in the description of the present invention.

Having thus described the invention, it is apparent that numerous modifications and improvements may be made by those skilled in the art, all of which fall within the scope of the invention. Therefore, the invention herein disclosed should be construed to be limited only to the spirit and scope of the appended claims.

What is claimed is:
1. A monitoring system for measuring radiation from collected particulate matter which includes RaC' comprising: phosphorescent means positioned to intercept a substantial portion of alpha particles emitted from said collected particulate matter and to emanate in response to said incident alpha particles light pulses having a first decay time, said phosphorescent means having sufficient thickness to interact with substantially all of the alpha particles incident thereon and to pass substantially all of the beta particles incident thereon; scintillating means positioned to interact with a substantial portion of all beta particles emitted from said particulate matter, said scintillating means emanating in response to each of said interacting beta particles light pulses having a second decay time; means for detecting said light pulses having said first and second decay times and for providing on an output electrical pulses having corresponding first and second decay times; scaler means for counting said electrical pulses; and means responsive to the output of said scaler means for detecting means for gating off said scaler means for a chosen time interval greater than several half-lives of RaC' each time an electrical pulse having said second decay time appears at said output.

2. The apparatus of claim 1 wherein said scintillating means is characterized by having a void therein defining an inner surface and said phosphorescent means comprises a continuous film covering at least a portion of said inner surface.

3. Apparatus in accordance with claim 2 and including filtering means located centrally in said void to collect said particulate matter, said scintillating means having intake and exhaust channels therethrough entering above and below said filtering means.

4. A monitoring system comprising: filtering means for collecting particulate matter; a phosphorescent film positioned to intercept substantially all alpha particles emitted from said filtering means and of sufficient thickness to stop substantially all alpha particles and to pass substantially all beta particles emitted from said particulate matter, said film emitting in response to each of said stopped alpha particles, light pulses having a first decay time; scintillating means surrounding both said phosphorescent film and said filtering means for intercepting substantially all beta particles emitted from said filtering means, said scintillating means having sufficient mass to stop substantially all beta particles emitted from said particulate matter, said scintillating means emanating, in response to each of said stopped beta particles, light pulses having a second decay time; means for detecting said light pulses having said first and second decay times and for providing on an output electrical pulses having corresponding first and second decay times; discriminating means responsive to said detecting means for directing electrical pulses having said first decay time onto a first discriminator output and electrical pulses having said second decay time onto a second discriminator output; scaler means for counting said electrical pulses; and means responsive to said discriminating means for gating off said scaler means for a chosen time interval each time an electrical pulse appears at said second discriminator output.

5. A radiation detector suitable for use in a monitoring system comprising: filtering means for collecting particulate matter; a phosphorescent film positioned to intercept substantially all alpha particles emitted from said filtering means and of sufficient thickness to stop substantially all alpha particles and to pass substantially all beta particles emitted from said particulate matter, said film emanating in response to each of said stopped alpha particles light pulses having a first decay time; scintillating means surrounding both said phosphorescent film and said filtering means to intercept substantially all beta particles emitted from said filtering means, said scintillating means having sufficient mass to stop substantially all beta particles emitted from said particulate matter, said scintillating means emanating in response to each of said stopped beta particles light pulses having a second decay time; and means for detecting said light pulses having said first and second decay times and for providing on an output electrical pulses having corresponding first and second decay times, said means including a single photosensitive surface to receive said light pulses having said first and second decay times.

References Cited
UNITED STATES PATENTS

| | | | |
|---|---|---|---|
| 2,727,154 | 12/1955 | Goldsworthy | 250—71.5 |
| 2,892,091 | 6/1959 | Sawle | 250—71.5 |
| 2,910,592 | 10/1959 | Armistead | 250—71.5 |
| 3,133,195 | 5/1964 | Jones et al. | 250—71.5 X |
| 3,202,819 | 8/1965 | Christianson | 250—71.5 |

RALPH G. NILSON, *Primary Examiner.*

S. ELBAUM, *Assistant Examiner.*